US011862902B2

(12) United States Patent
Cheng

(10) Patent No.: US 11,862,902 B2
(45) Date of Patent: Jan. 2, 2024

(54) ELECTRICAL CONNECTOR WITH ELECTROMAGNETIC SHIELDING FUNCTION

(71) Applicant: JESS-LINK PRODUCTS CO., LTD., New Taipei (TW)

(72) Inventor: Chieh-Ming Cheng, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 74 days.

(21) Appl. No.: 17/584,008

(22) Filed: Jan. 25, 2022

(65) Prior Publication Data

US 2022/0239042 A1 Jul. 28, 2022

(30) Foreign Application Priority Data

Jan. 28, 2021 (TW) ................................ 110103299

(51) Int. Cl.

| | |
|---|---|
| ***H01R 13/6591*** | (2011.01) |
| ***H01R 13/6594*** | (2011.01) |
| ***H01R 13/6593*** | (2011.01) |
| *H01R 13/6599* | (2011.01) |
| *H01R 13/6595* | (2011.01) |
| *H01R 13/6592* | (2011.01) |
| *H01R 12/62* | (2011.01) |

(52) U.S. Cl.

CPC ... *H01R 13/65912* (2020.08); *H01R 13/6593* (2013.01); *H01R 13/6594* (2013.01); *H01R 13/65914* (2020.08); *H01R 12/62* (2013.01); *H01R 13/6592* (2013.01); *H01R 13/6595* (2013.01); *H01R 13/6599* (2013.01); *H01R 13/65915* (2020.08); *H01R 13/65917* (2020.08)

(58) Field of Classification Search

CPC ........ H01R 13/65912; H01R 13/65914; H01R 13/6593; H01R 13/6594; H01R 12/62; H01R 13/65915; H01R 13/65917; H01R 13/6592; H01R 13/6595; H01R 13/6599

See application file for complete search history.

(56) References Cited

U.S. PATENT DOCUMENTS

2013/0280955 A1* 10/2013 Alden, III ............ H01R 9/0515 361/748
2020/0395717 A1* 12/2020 Kim .................. H01R 13/6593

FOREIGN PATENT DOCUMENTS

CN 112086775 A 12/2020
TW 202017267 A 5/2020

* cited by examiner

*Primary Examiner* — Abdullah A Riyami
*Assistant Examiner* — Justin M Kratt

(57) ABSTRACT

An electrical connector with electromagnetic shielding function includes a circuit board, a plurality of cables and a shielding component. The circuit board includes a plurality of conductive pads and a ground component. Each of cables includes a wire core and a shielding layer for covering the wire core. One end of the wire core is exposed from the shielding layer, and the wire cores of the cables are electrically connected to the conductive pads respectively. The shielding component is configured on the circuit board and electrically connected to the ground component. The shielding component forms a plurality of shielding grooves for covering the conductive pads and the cables. Each of the shielding grooves includes a contact portion configured to contact the shielding layer and a shielding portion configured to cover the exposed wire core of the cables to provide electromagnetic shielding to the cables.

9 Claims, 7 Drawing Sheets

ELECTRICAL CONNECTOR WITH ELECTROMAGNETIC SHIELDING FUNCTION

BACKGROUND OF THE INVENTION

1. Field of the Invention

The present invention relates to an electrical connector, and more particularly, to an electrical connector that can prevent inside and outside electromagnetic interference of the electrical connector and has an electromagnetic shielding function.

2. Description of the Prior Art

Connectors are connecting components and accessories for electrical signals, and the electronic devices translate and transmit the signal to each other through cables and connectors. That is to say, the connectors are the communicating bridges for the signals. The connectors are widely applied to cars and computer peripheral and communicating data applications, industries, military and aerospace industry, transportation, consumer electronics, medical treatments, instruments, commercial equipment and so on. Therefore, the connectors play an important role in many fields.

In general, when the frequency of the signal transmitted by the connector is higher, the signal is more easily affected by internal or external factors, such as Electromagnetic Interference (EMI) or Radio Frequency Interference (RFI). The connector will suffer from electromagnetic interference or radio frequency interference, resulting in incomplete signals to affect the transmission quality. In addition, with the development of the electronic industry, electronic products all tend to be miniaturized, so that the distances between the cables inside the connector are getting closer and closer. Since the reduced distance between the cables is not conducive to the transmission of high-frequency signals, it is easy to cause crosstalk between the high-frequency differential cables. Therefore, the signal transmission characteristics of the connector are affected due to the above-mentioned interference reasons.

In order to prevent inside and outside electromagnetic interference of the electrical connector, the cable includes an insulating layer covering the wire core and includes a meal mesh covering the insulating layer to form the shielding layer. The main function of the shielding layer is to shield the electromagnetic field generated by the cable during energizing in the insulated wire core to reduce electromagnetic interference to the external environment. However, when the cable is connected to the circuit board of the electrical connector, the shielding layer and the insulating layer of the cable need to be stripped to expose the wire core, and then the wire core is soldered on the circuit board. At this time, there is no shielding layer protection between the cores of each cable, which may still cause crosstalk between the cables. In addition, the stripped shielding layer may be exposed outside the cable, so that the shielding layer has a great influence on the resistance connection and insertion loss of the cable, thereby reducing the transmission quality of the cable.

Therefore, it is necessary to provide an electrical connector to prevent inside and outside electromagnetic interference of the electrical connector to solve the problems of the prior art.

SUMMARY OF THE INVENTION

Therefore, the present invention provides an electrical connector with electromagnetic shielding function. In one embodiment, the electrical connector with electromagnetic shielding function includes a circuit board, a plurality of cables and a shielding component. The circuit board includes a plurality of conductive pads and a ground component. The plurality of cables are connected to the circuit board. Each of cables includes a wire core and a shielding layer covering the wire core. One end of the wire core is exposed from the shielding layer, and the wire cores of the cables are electrically connected to the conductive pads respectively. The shielding component is disposed on the circuit board and electrically connected to the ground component. The shielding component forms a plurality of shielding grooves for covering the conductive pads and the cables. Each of shielding grooves includes a contact portion and a shielding portion extending from the contact portion. The contact portions of the shielding grooves contact the shielding layers of the cables in series and the shielding portions of the shielding grooves cover the exposed wire cores of the cables respectively to provide electromagnetic shielding to the cables.

Wherein, the shielding component includes a plurality of rib structures configured on the contact portions of the shielding grooves respectively. The rib structures are configured to respectively contact the shielding layers of the cables.

Wherein, the shapes of the contact portions of the shielding grooves are corresponding to the shapes of the shielding layers of the cables.

Wherein, the conductive pads include a first conductive pad and a second conductive pad. The cables include a first cable, and the first cable includes a first wire core and a second wire core. The first conductive pad and the second conductive pad are disposed in a first shielding groove of the shielding grooves, and the first wire core and the second wire core are connected to the first conductive pad and the second conductive pad respectively.

Wherein, the shielding component includes a plurality of protruding structures configured on the shielding portions of the shielding grooves. The protruding structures are located between the two adjacent cables respectively.

Furthermore, the ground component includes a plurality of ground pads. The number and positions of the ground pads are corresponding to those of the protruding structures, and the protruding structures are connected to the ground pads respectively.

Wherein, the shielding component includes a first sidewall and a second sidewall. The first sidewall is opposite to the second sidewall and the shielding grooves are disposed between the first sidewall and the second sidewall. The lengths of the first sidewall and the second sidewall are smaller than the lengths of the protruding structures.

In one embodiment, the ground component is a ground layer, and the shielding component is electrically connected to the ground layer by means of riveting or snapping.

Wherein, the material of the shielding component is one of metal and conductive plastics.

Wherein, the shielding component includes a third sidewall configured on the shielding portion and connected to the shielding grooves to make the shielding portions completely cover the wire cores of the cables and the shielding component not to contact the wire cores.

In summary, the electrical connector with electromagnetic shielding function of the present invention can cover the wire core of the cable and contact the shielding layer of the cable at the same time by the shielding component to provide the electromagnetic shielding, thereby increasing efficiency. Furthermore, the electrical connector of the present invention can separate the two adjacent cables and generate electromagnetic shielding through the protruding structures of the shielding component, to prevent crosstalk between cables inside electrical connectors, thereby increasing the electromagnetic shielding efficiency. Moreover, the shielding component of the electrical connector of the present invention can contact the shielding layer of the cable in different ways to adapt to cables with different wire diameters, thereby improving the efficiency. In addition, the electrical connector of the present invention can cover the wire core and the shielding layer of the cable to prevent the cables of the electrical connector from being electromagnetically interfered by other external electronic components, thereby improving the transmission quality and efficiency.

BRIEF DESCRIPTION OF THE APPENDED DRAWINGS

DETAILED DESCRIPTION OF THE INVENTION

Figure 1:
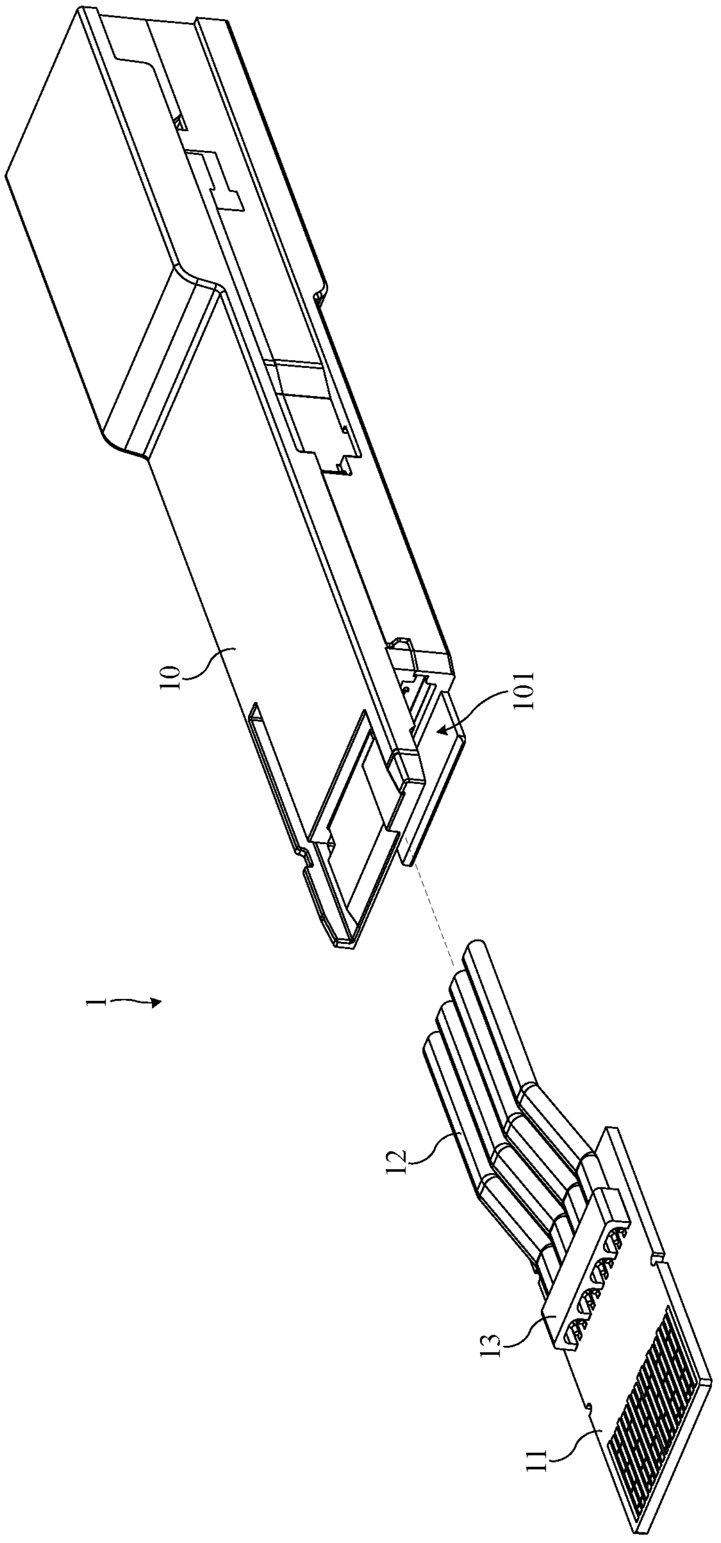
FIG. 1 is a partial exploded diagram illustrating an electrical connector with electromagnetic shielding function according to an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of this specification, the description with reference to the terms "a specific embodiment", "another specific embodiment" or "parts of specific embodiments" etc. means that the specific feature, structure, material or feature described in conjunction with the embodiment include in at least one embodiment of the present invention. In this specification, the schematic representations of the above-mentioned terms do not necessarily refer to the same embodiment. Moreover, the described specific features, structures, materials or characteristics can be combined in any one or more embodiments in a suitable manner.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 2:
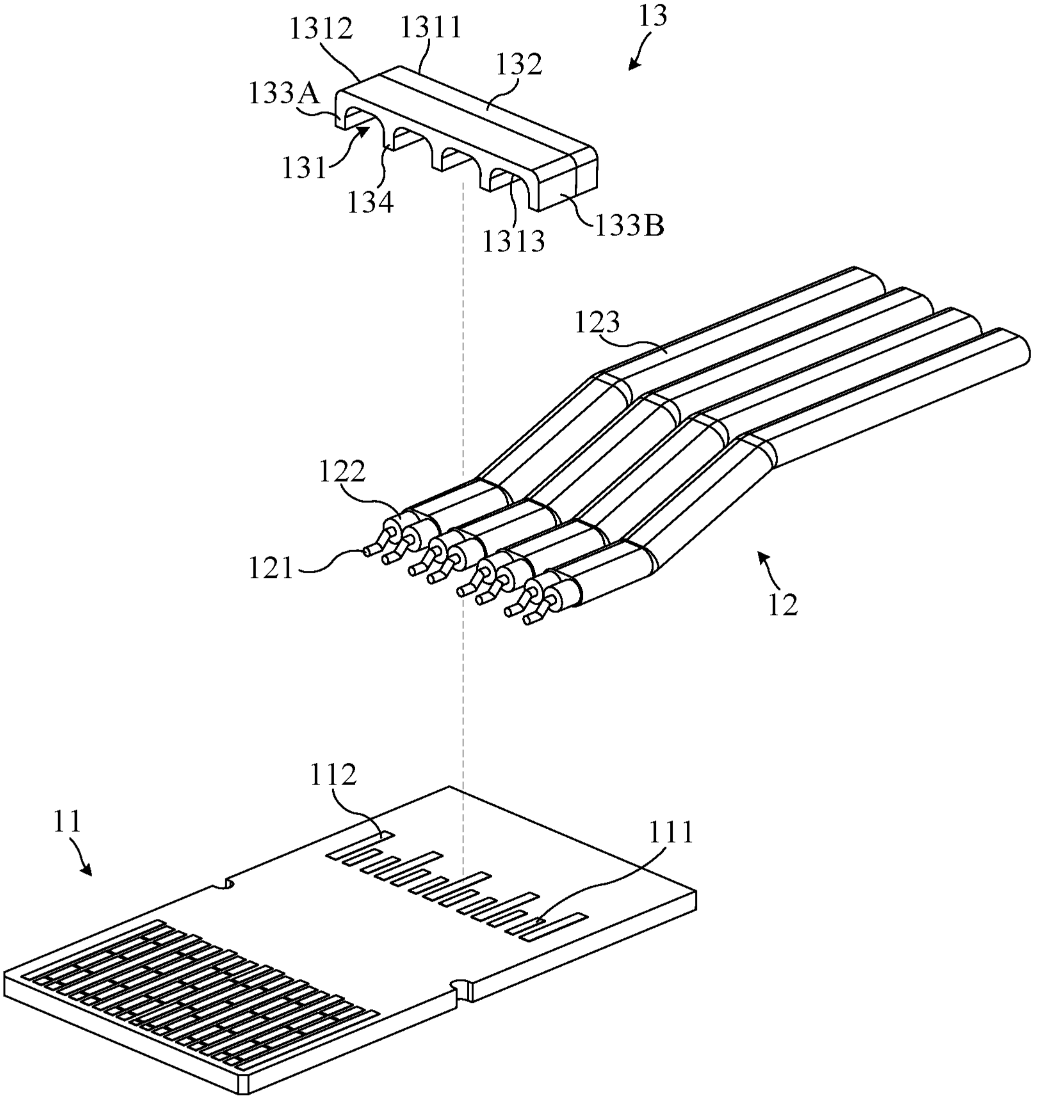
FIG. 2 is an exploded diagram illustrating the circuit board, the cables and the shielding component in FIG. 1.

Please refer to FIG. 1 and FIG. 2. FIG. 1 is a partial exploded diagram illustrating an electrical connector 1 with electromagnetic shielding function according to an embodiment of the present invention. FIG. 2 is an exploded diagram illustrating the circuit board 11, the cables 12 and the shielding component 13 in FIG. 1. As shown in FIG. 1 and FIG. 2, in this embodiment, the electrical connector 1 with electromagnetic shielding function includes a case 10, a circuit board 11, a plurality of cables 12 and a shielding component 13. The circuit board 11, the plurality of cables 12 and the shielding component 13 are configured in the case 10. The circuit board 11 includes a plurality of conductive pads 111 and a plurality of ground pads 112. The plurality of cables 12 are connected to the circuit board 11. Each of cables 12 includes a wire core 121 and a shielding layer 123 covering the wire core 121. One end of the wire core 121 is exposed from the shielding layer 123, and the wire cores 121 of the cables 12 are electrically connected to the conductive pads 111 respectively. The shielding component 13 is configured on the circuit board 11 and electrically connected to the ground pads 112. The shielding component 13 forms a plurality of shielding grooves 131 for covering the conductive pads 111 and the cables 12. The shielding groove 131 includes a contact portion 1311 and a shielding portion 1312 extended from the contact portion 1311. The contact portions of the shielding grooves 131 are contacted the shielding layers 123 of the cables 12 respectively and the shielding portions 1312 of the shielding grooves 131 cover the exposed wire cores 121 of the cables 12 respectively to provide electromagnetic shielding to the cables 12.

In practice, the case 10 of the electrical connector 1 with electromagnetic shielding function has an opening 101 and a containing space communicated with the opening 101. The circuit board 11, the cables 12 and the shielding component 13 can be disposed in the containing space from the opening 101 to be installed in the case 10. When the electrical connector 1 is assembled, one end of the circuit board 11 is exposed outside the case 10 to connect to the socket of the electrical connector 1, and the other end of the circuit board 11 includes a plurality of conductive pads 111 and a plurality of ground pads 112 configured to electrically connect the cables 12 and the shielding component 13 respectively. The conductive pads 111 and the ground pads 112 can be arranged in a straight line, and the conductive pads 111 and the ground pads 112 can be staggered. It should be noted that the arrangement of the conductive pads 111 and the ground pads 112 is not limited in FIG. 2, and the sizes of the conductive pads 111 and the ground pads 112 can be designed as requirement.

As shown in FIG. 2, in this embodiment, the cable 12 includes a wire core 121, insulating layer 122 and a shielding layer 123. The insulating layer 122 covers the wire core 121, and the shielding layer 123 covers the insulating layer. Furthermore, one end of the insulating layer 122 is exposed from the shielding layer 123, and one end of the wire core 121 is exposed from the insulating layer 122. When the electrical connector 1 is assembled, the wire core 121 of the cable 12 is electrically connected to the conductive pad 111 of the circuit board 11. In practice, the wire core 121 can be fixed and electrically connected to the conductive pad 111 of the circuit board 11 by welding for transmission. The shielding layer 123 can be a sheet-like or mesh-like aluminum foil layer to shield the electromagnetic field generated by the wire core 121 due to the passing of current. The material of the shielding layer 123 is not limited to aluminum. The material of the shielding layer 123 also can be other conductive materials. The insulating layer 122 between the wire core 121 and the shielding layer 123 can not only ensure the transmission function of the wire core 121, but also separate the wire core 121 from the shielding layer 123. The cable 12 further can include an oversheath (not shown in figure) covering the shielding layer 123, and partial shielding layer 123 is exposed from the oversheath. In this embodiment, the shielding layer 123 of the cable 12 is configured in the case 10 of the electrical connector 1 and the oversheath of the cable 12 is configured outside of the case 10 of the electrical connector 1, but it is not limited hereto. The length of the shielding layer of the cable and the configuration of the oversheath can be determined according to design or requirement.

The shielding component 13 is substantially U-shaped and has a top portion 132, a first sidewall 133A and a second sidewall 133B. Moreover, the shielding component 13 includes a plurality of protruding structure 134 extended from the top portion 132 and disposed between the first sidewall 133A and the second sidewall 133B. The shielding groove 131 can be formed among the top portion 132, the first sidewall 133A and the second sidewall 133B, among the top portion 132, the second sidewall 133B and the protruding structure 134, and among the top portion and the two protruding structures 134. In addition, each of shielding grooves 131 includes a contact portion 1311 and a shielding portion 1312. As shown in FIG. 2, the contact portion 1311 is located at the one end of the shielding groove 131, and the shielding portion 1312 is located at the other end of the shielding groove 131 relative to the contact portion 1311. In this embodiment, the shielding component 13 includes four shielding grooves 131 and three protruding structures 134, and each of protruding structures 134 is between the two shielding grooves 131 respectively. In practice, number of the shielding groove 131 and protruding structure 134 of the shielding component 13 is not limited hereto, the number of the shielding groove 131 and protruding structure 134 also can be determined according to design or requirement.

In this embodiment, the number and position of the ground pads 112 of the circuit board 11 are corresponding to those of the protruding structures 134 of the shielding component 13, and the protruding structures 134 of the shielding component 13 are electrically connected to the ground pads 112 of the circuit board 11 respectively. As shown in FIG. 2, the circuit board 11 of the electrical connector 1 includes five ground pads 112, and the first sidewall 133A, the second sidewall 133B and the protruding structures 134 of the shielding component 13 are electrically connected to the ground pads respectively to make the shielding component 13 being grounded. In practice, the material of the shielding component 13 can be selected from metal, conductive plastic or other conductive materials. Furthermore, the first sidewall 133A, the second sidewall 133B and protruding structure 134 of the shielding component 13 can be fixed on the circuit board 11 and electrically connected to the ground pads 112 by welding, riveting, snapping to make the shielding component 13 being grounded. Since the first sidewall 133A, the second sidewall 133B and protruding structure 134 of the shielding component 13 are grounded and the top portion 132 of the shielding component 13 is connected to the first sidewall 133A, the second sidewall 133B and protruding structure 134, the shielding grooves 131 of the shielding component 13 have electromagnetic shielding function.

Figure 3:
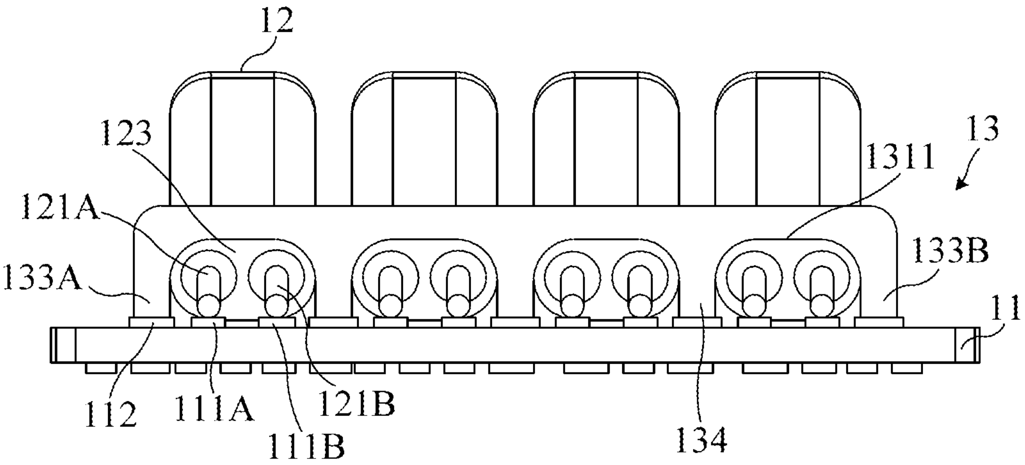
FIG. 3 is a sectional diagram illustrating the circuit board, the cables and the shielding component in one perspective view of FIG. 1.
Figure 4:
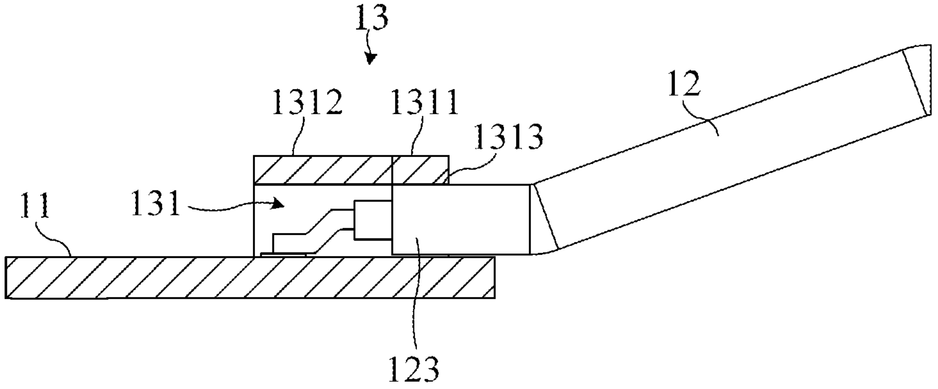
FIG. 4 is a sectional diagram illustrating the circuit board, the cables and the shielding component in another perspective view of FIG. 1.

Please refer to FIG. 1 to FIG. 4. FIG. 3 is a sectional diagram illustrating the circuit board 11, the cables 12 and the shielding component 13 in one perspective view of FIG. 1. FIG. 4 is a sectional diagram illustrating the circuit board 11, the cables 12 and the shielding component 13 in another perspective view of FIG. 1. As shown in FIG. 2, FIG. 3 and FIG. 4, in this embodiment, the electrical connector 1 includes four cables 12, and each of cables 12 includes a first wire core 121A and a second wire core 121B. The number of the shielding groove 131 of the shielding component 13 is corresponding to that of cables 12, and the first sidewall 133A, the second sidewall 133B and protruding structure 134 of the shielding component 13 are electrically connected to the ground pads 112. Moreover, the circuit board 11 includes a first conductive pad 111A and a second conductive pad 111B between each two ground pads 112.

When the electrical connector 1 is assembled, the first wire core 121A and the second wire core 121B of the cable 12 are fixed to the first conductive pad 111A and the second conductive pad 111B respectively. The shielding component 13 is configured above the cable 12 and first sidewall 133A, the second sidewall 133B and the protruding structures 134 of the shielding component 13 are fixed on the ground pads 112 of the circuit board 11. At this time, the position of the shielding groove 131 of the shielding component 13 is corresponding to that of the cable 12. The first conductive pad 111A and the second conductive pad 111B of the circuit board 11 and the first wire core 121A and the second wire core 121B of the cable 12 are located in the same shielding groove 131. Furthermore, the wall surface 1313 of the contact portion 1311 of the shielding groove 131 is contacted to the shielding layer 123 of the cable 12, and the shielding portion 1312 of the shielding component 13 covers the first wire core 121A and the second wire core 121B of the cable 12 and the first conductive pad 111A and the second conductive pad 111B of the circuit board 11, to provide electromagnetic shielding to the first wire core 121A and the second wire core 121B of the cable 12.

In practice, the shielding component 13 is connected to the ground pad 112 of the circuit board 11, and the contact portion 1311 of the shielding groove 131 of the shielding component 13 is contacted to the shielding layer 123 of the cable 12. That is to say, the shielding layer 123 of the cable 12 can be electrically connected to the ground pad 112 through the shielding component 13. The shape of the contact portion 1311 of the shielding groove 131 can be corresponding to that of the shielding layer 123 of the cable 12. When all the shielding grooves 131 contact the shielding layers 123 of the cables 12 respectively, the shielding grooves 131 can connect the shielding layers 123 of all the cables 12 in series through the contact portions 1311 to be grounded. Therefore, the electrical connector of the present invention can enhance the electromagnetic shielding effect of the cables through the shielding component, thereby improving the efficiency.

Moreover, when the electrical connector 1 is assembled, the cables 12 are disposed in the shielding grooves 131 respectively. In other words, the protruding structure 134 is located between each two adjacent cables 12. In practice, when the cables 12 are the high frequency differential signal cables, the protruding structure 134 of the shielding component 13 can shield the two cables 12 located in the adjacent two shielding grooves 131 to prevent crosstalk between the cables inside the electrical connector, and can replace the ground wire of the cable, thereby improving efficiency and saving cost. Furthermore, when the electrical connector 1 is assembled, the shielding component 13 contacts the shielding layer 123 of the cable 12 and covers the wire core 121 of the cable 12. Therefore, the electrical connector of the present invention also can effectively block the electromagnetic interference of other electrical components outside the electrical connector, thereby improving the transmission quality and efficiency.

The connection manner of the first sidewall, the second sidewall and the protruding structure of the shielding component and the ground pad of the circuit board can be other types. In one embodiment, the lengths of the first sidewall and the second sidewall of the shielding component are smaller than the lengths of the protruding structures, and the protruding structures of the shielding component are connected to the ground pads of the circuit board. In practice, when the protruding structures of the shielding component are connected to the ground pads of the circuit board, the shielding component has electromagnetic shielding function. That is to say, the first sidewall and the second sidewall that not connected to the ground pad of the circuit board still have electromagnetic shielding function. In another one embodiment, the lengths of the first sidewall and the second sidewall of the shielding component are greater than the lengths of the protruding structures, and the first sidewall and the second sidewall are connected to the ground pads of the circuit. In practice, when the first sidewall and the second sidewall are connected to the ground pads of the circuit, the shielding component has electromagnetic shielding function. Furthermore, the protruding structures that not connected to the ground pad of the circuit board still have electromagnetic shielding function. Therefore, the protruding structures of the shielding component can prevent crosstalk among the cables.

In addition, in one embodiment, the top portion of the shielding component further includes a plurality of grooves opposite to the plurality of shielding grooves, and the cables can configured in the grooves of the shielding component. In practice, when the electrical connector is designed to include upper and lower layers of cables, the cables in the lower layer can be attached to the circuit board, and the shielding grooves of the shielding component can be configured on the cables in the lower layer. Then, the wire core of the cable on the upper layer is soldered to the circuit board, and the shielding layer of the cable can further be configured and contacted the groove of the shielding component. Therefore, the shielding component not only can prevent the crosstalk between the cables of the same layer through the shielding groove, but also prevent the interference between the cables of different layers through the groove, so that the cables to be arranged neatly and not easily entangled to save space. The number of the groove can be corresponding to that of the cables of the upper layer.

In addition to the ground component of the circuit board can be the ground pad described in the aforementioned embodiment, the ground component also can be in other forms. In one embodiment, the ground component is a ground layer, and the shielding component is electrically connected to the ground layer. In practice, the circuit board can be a multi-layer printed circuit board, and the ground layer can be configured in the circuit board. The layers other than the ground layer of the circuit board may be formed a plurality of holes by etching, and the positions of the holes can be corresponding to the positions of the sidewalls of the shielding component. When the shielding component is configured on the circuit board, the sidewalls of the shielding component can pass through the holes and be connected to the ground layer of the circuit board by riveting and snapping, so that the shielding component is grounded and has shielding function. Similarly, the positions of the holes of the circuit board further can be corresponding to the positions of the sidewall of the shielding component. The protruding structures of the shielding component can pass through the holes and be connected to the ground layer of the circuit board by riveting and snapping.

Figure 5A:
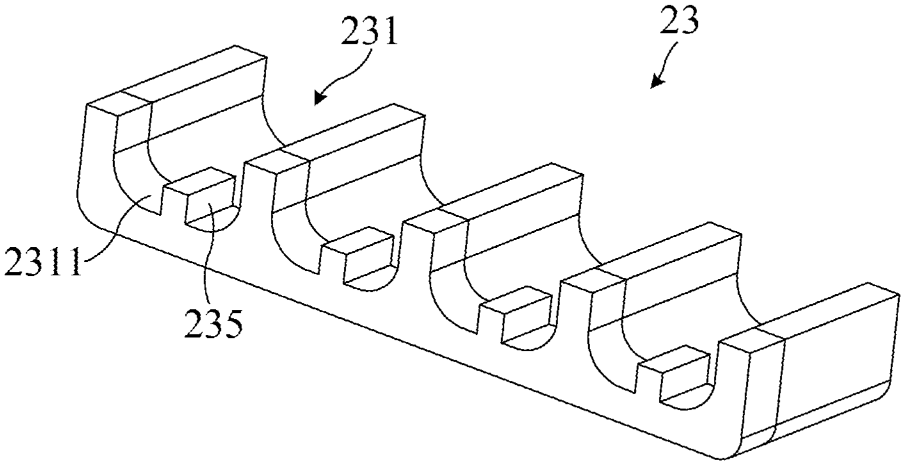
FIG. 5A is a structure schematic diagram illustrating the shielding component according to an embodiment of the present invention.
Figure 5B:
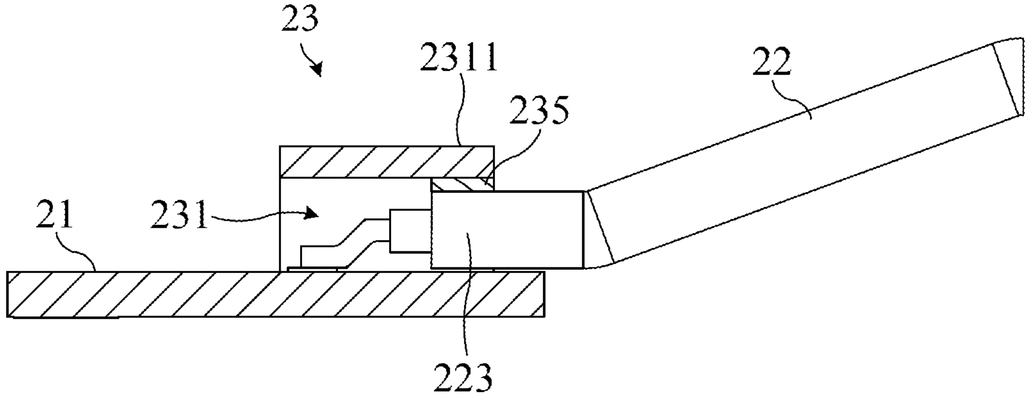
FIG. 5B is a sectional diagram illustrating the shielding component, the circuit board and the cables in one perspective view of FIG. 5A.

In addition to the shielding component can be the structure described in the aforementioned embodiment, the ground component also can be in other forms. Please refer to FIG. 5A and FIG. 5B. FIG. 5A is a structure schematic diagram illustrating the shielding component 23 according to an embodiment of the present invention. FIG. 5B is a sectional diagram illustrating the shielding component 23, the circuit board 21 and the cables 22 in one perspective view of FIG. 5A. As shown in FIG. 5A, the difference between this embodiment and the aforementioned embodiment is that the shielding component 23 of this embodiment further includes a plurality of rib structures 235. The rib structures 235 are configured on the contact portion 2311 of the shielding component 23 and located in the shielding grooves 231 respectively. In practice, the shape of the rib structure 235 can be square shape, rectangle shape or arc shape. The rib structures 235 can be integrally formed on the shielding component 23 or can be configured on the shielding component 23 by stamping. When the electrical connector is assembled, the rib structure 235 of the shielding component 23 contacts the shielding layer 223 of the cable 22 to provide electromagnetic shielding to the cable 22. In this embodiment, rib structures 235 are located at the top portion of the shielding component 23, but it is not limited hereto, the rib structures 235 also can be located at the sidewall of the contact portion 2311 or on the protruding structure. The electrical connector may include cables with different wire diameters due to design or requirements. Therefore, the shielding component of the electrical connector of the present invention can contact the shielding layer of the cable with the smaller wire diameter through the rib structures to improve the shielding efficiency.

Figure 6A:
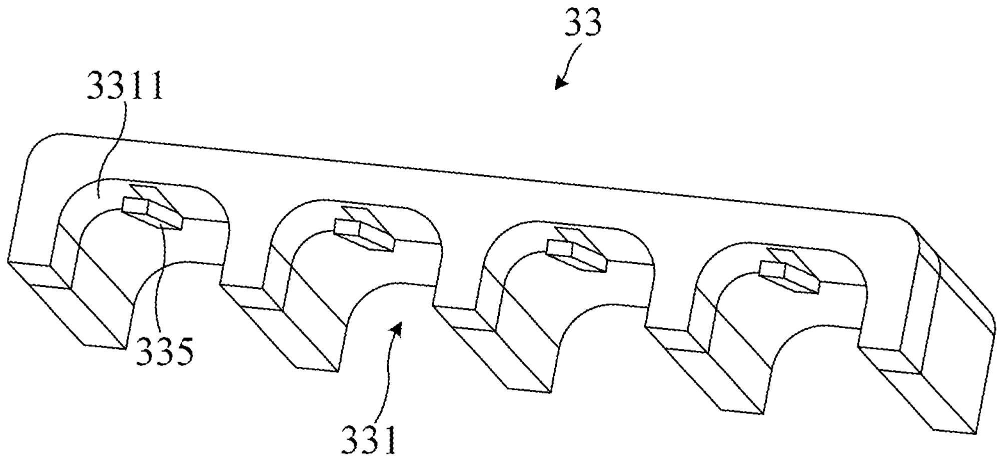
FIG. 6A is a structure schematic diagram illustrating the shielding component according to another one embodiment of the present invention.
Figure 6B:
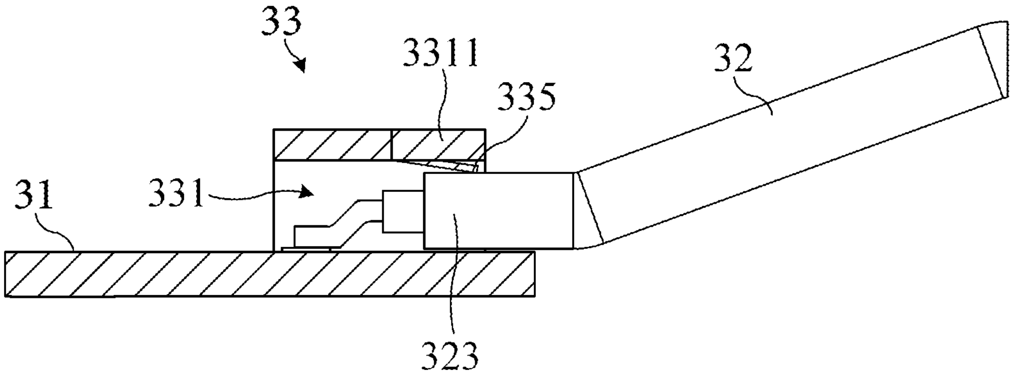
FIG. 6B is a sectional diagram illustrating the shielding component, the circuit board and the cables in one perspective view of FIG. 6A.

Please refer to FIG. 6A and FIG. 6B. FIG. 6A is a structure schematic diagram illustrating the shielding component 33 according to another one embodiment of the present invention. FIG. 6B is a sectional diagram illustrating the shielding component 33, the circuit board 31 and the cables 32 in one perspective view of FIG. 6A. As shown in FIG. 6A, the difference between this embodiment and the aforementioned embodiment is that the shielding component 33 of this embodiment further includes a plurality of elastic structures 335. The elastic structure 335 is configured on the contact portion 3311 of the shielding groove 331 and extended from wall surface toward the shielding groove 331. In practice, the elastic structure 335 can be an elastic arm, and the elastic arm can be formed on the shielding component 33 by stamping. Since the electrical connector may include cables with different wire diameters due to design or requirements, the elastic structure 335 located at the shielding groove 331 can contact the shielding layer 323 of the cable 32 with the smaller wire diameter to provide electromagnetic shielding to the cable 32 when the electrical connector is assembled. Furthermore, the cable 32 with the larger wire diameter can compress the elastic structure 335 of the shielding component 33, then the elastic structure 335 resists and contacts the shielding layer 323 of the cable 32 according to the elastic force generated by compressed to provide electromagnetic shielding to the cable 32. Therefore, the shielding component of the electrical connector of the present invention can contact the shielding layer of the cable with the smaller wire diameter through the elastic structures to improve the shielding efficiency.

Figure 7A:
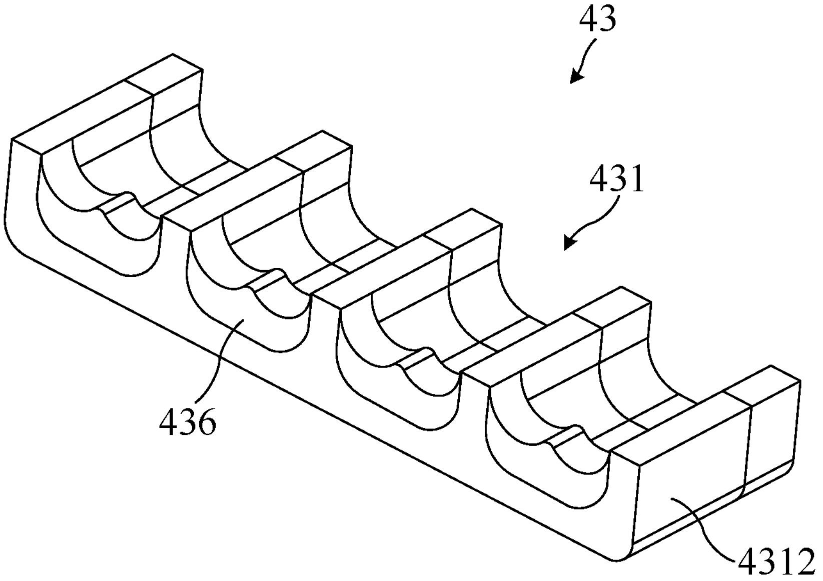
FIG. 7A is a structure schematic diagram illustrating the shielding component according to an embodiment of the present invention.
Figure 7B:
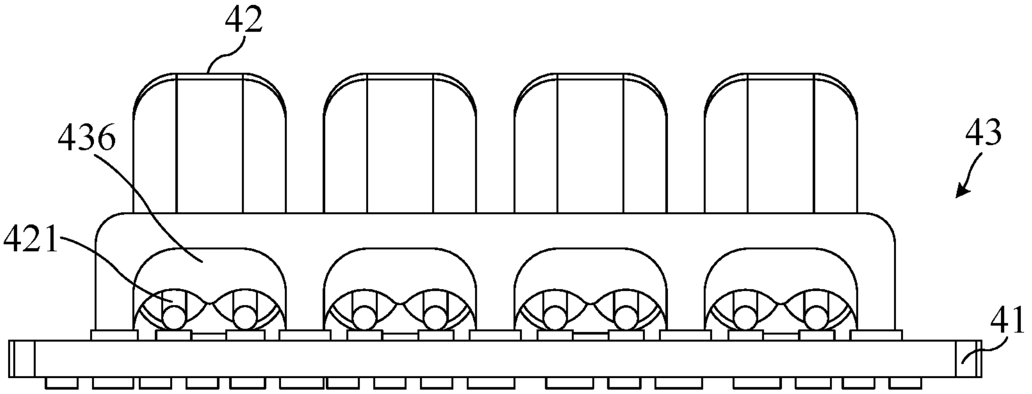
FIG. 7B is an assembly diagram illustrating the shielding component, the circuit board and the cables in FIG. 7A.

Please refer to FIG. 7A and FIG. 7B. FIG. 7A is a structure schematic diagram illustrating the shielding component 43 according to an embodiment of the present invention. FIG. 7B is an assembly diagram illustrating the shielding component 43, the circuit board 41 and the cables 42 in FIG. 7A. As shown in FIG. 7A and FIG. 7B, in this embodiment, the shielding portion 4312 of the shielding component 43 further includes a plurality of separating structures 436 configured in the shielding grooves 431 respectively. Each of the separating structures 436 is configured on the end of the shielding component 43 close to the wire core 421 of the cable 42. The shape of the separating structure 436 can be corresponding to that of the wire core 421 of the cable 42. When the shielding component 43 is configured on the circuit board 41, the shielding portion 4312 of the shielding component 43 can cover and separate the two wire cores 421 of the cables 42 by separating structures 436 to provide electromagnetic shielding between the wire cores 421 of the cables 42, thereby increasing shielding efficiency.

Figure 8A:
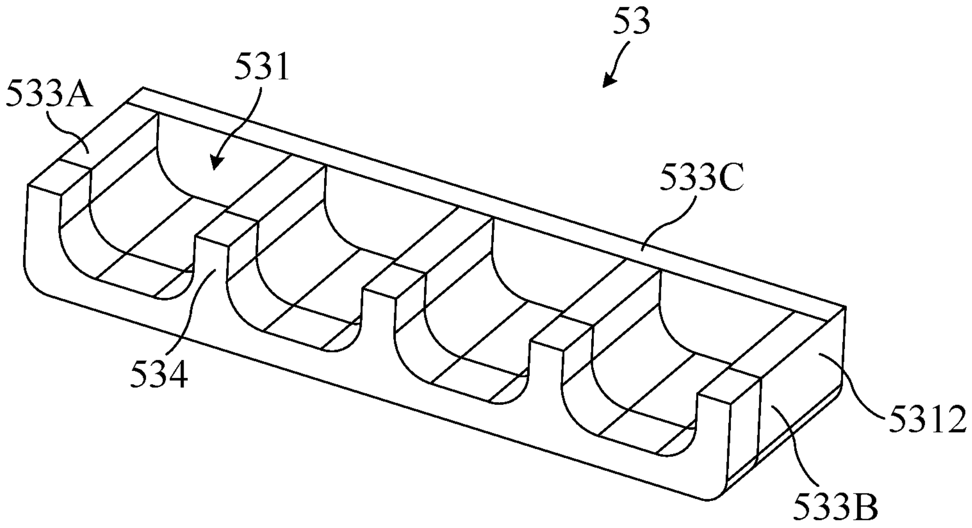
FIG. 8A is a structure schematic diagram illustrating the shielding component according to an embodiment of the present invention.
Figure 8B:
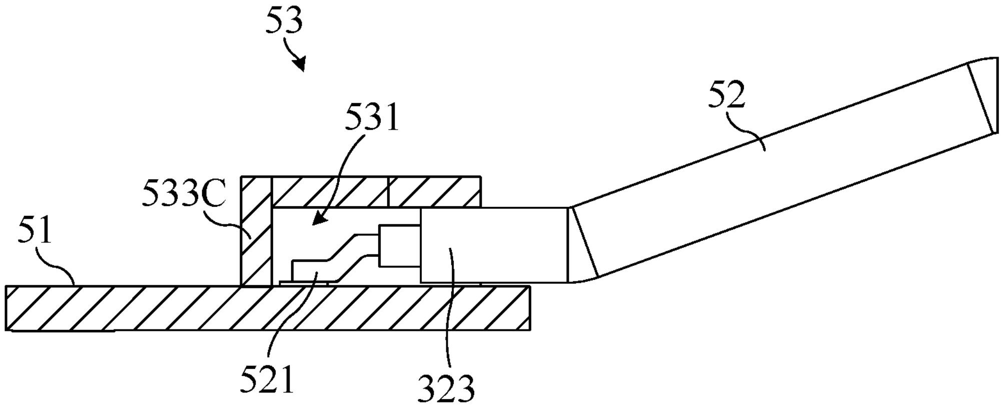
FIG. 8B is a sectional diagram illustrating the shielding component, the circuit board and the cables in one perspective view of FIG. 8A.

Please refer to FIG. 8A and FIG. 8B. FIG. 8A is a structure schematic diagram illustrating the shielding component 53 according to an embodiment of the present invention. FIG. 8B is a sectional diagram illustrating the shielding component 53, the circuit board 51 and the cables 52 in one perspective view of FIG. 8A. As shown in FIG. 8A and FIG. 8B, the difference between this embodiment and the aforementioned embodiment is that the shielding component 53 of this embodiment further includes a third sidewall 533C configured on the shielding portion 5312 and connected to the shielding grooves 531. In practice, the third sidewall 533C can be configured on the end of the shielding component 53 and cover one end of the opening of the shielding grooves 531. Moreover, the third sidewall 533C can be configured on one end of the shielding component 53 close to the wire core 521 of the cable 52. The third sidewall 533C can be connected to the first sidewall 533A and the second sidewall 533B of the shielding component 53, also can be connected to the protruding structures 534. When the shielding component 53 is configured on the circuit board 51, the shielding portion 5312 of the shielding component 53 can completely cover the wire core 521 of the cable 52 and the shielding component 53 does not contact the wire core 521 to provide electromagnetic shielding to the cable 52, thereby increasing shielding efficiency.

In summary, the electrical connector with electromagnetic shielding function of the present invention can cover the wire core of the cable and contact the shielding layer of the cable at the same time by the shielding component to provide the electromagnetic shielding, thereby increasing efficiency. Furthermore, the electrical connector of the present invention can separate the two adjacent cables and generate electromagnetic shielding through the protruding structures of the shielding component, to prevent crosstalk between cables inside electrical connectors, thereby increasing the electromagnetic shielding efficiency. Moreover, the shielding component of the electrical connector of the present invention can contact the shielding layer of the cable in different ways to adapt to cables with different wire diameters, thereby improving the efficiency. In addition, the electrical connector of the present invention can cover the wire core and the shielding layer of the cable to prevent the cables of the electrical connector from being electromagnetically interfered by other external electronic components, thereby improving the transmission quality and efficiency.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electrical connector with electromagnetic shielding function comprising:

a circuit board, comprising a plurality of conductive pads and a ground component;

a plurality of cables, connected to the circuit board, each of the cables comprising a wire core and a shielding layer covering the wire core, one end of the wire core being exposed from the shielding layer, and the wire cores of the cables being electrically connected to the conductive pads respectively; and a shielding component, configured on the circuit board and electrically connected to the ground component, the shielding component forming a plurality of shielding grooves for covering the conductive pads and the cables, each of the shielding grooves comprising a contact portion and a shielding portion extending the contact portion, the shielding component comprising a plurality of rib structures configured on the contact portions of the shielding grooves respectively, the rib contacting the shielding layers of the cables in series, and the shielding portions of the shielding grooves covering the exposed wire cores of the cables respectively to provide electromagnetic shielding to the cables.

2. The electrical connector with electromagnetic shielding function of claim 1, wherein the shapes of the contact portions of the shielding grooves are corresponding to the shapes of the shielding layers of the cables.

3. The electrical connector with electromagnetic shielding function of claim 1, wherein the conductive pads comprise a first conductive pad and a second conductive pad, the cables comprise a first cable, and the first cable comprises a first wire core and a second wire core, the first conductive pad and the second conductive pad are configured in a first shielding groove of the shielding grooves, and the first wire core and the second wire core are connected to the first conductive pad and the second conductive pad respectively.

4. The electrical connector with electromagnetic shielding function of claim 1, wherein the ground component is a ground layer, and the shielding component is electrically connected to the ground layer by means of riveting or snapping.

5. The electrical connector with electromagnetic shielding function of claim 1, wherein the material of the shielding component is one of metal and conductive plastics.

6. The electrical connector with electromagnetic shielding function of claim 1, wherein the shielding component comprises a plurality of protruding structures configured on the shielding portions of the shielding grooves, the protruding structures are located between two adjacent cables respectively.

7. The electrical connector with electromagnetic shielding function of claim 6, wherein the ground component comprises a plurality of ground pads, the number and positions of the ground pads are corresponding to those of the protruding structures, and the protruding structures are connected to the ground pads respectively.

8. The electrical connector with electromagnetic shielding function of claim 7, wherein the shielding component comprises a first sidewall and a second sidewall, the first sidewall is opposite to the second sidewall and the shielding grooves are configured between the first sidewall and the second sidewall, the lengths of the first sidewall and the second sidewall are smaller than those of the protruding structures.

9. The electrical connector with electromagnetic shielding function of claim 1, wherein the shielding component comprises a third sidewall configured on the shielding portion and connected to the shielding grooves, to make the shielding portions cover the wire cores of the cables and the shielding component not to contact the wire cores.

* * * * *